Dec. 20, 1960     C. CLARK, JR     2,965,844
VISUAL INDICATING APPARATUS
Filed Nov. 14, 1957
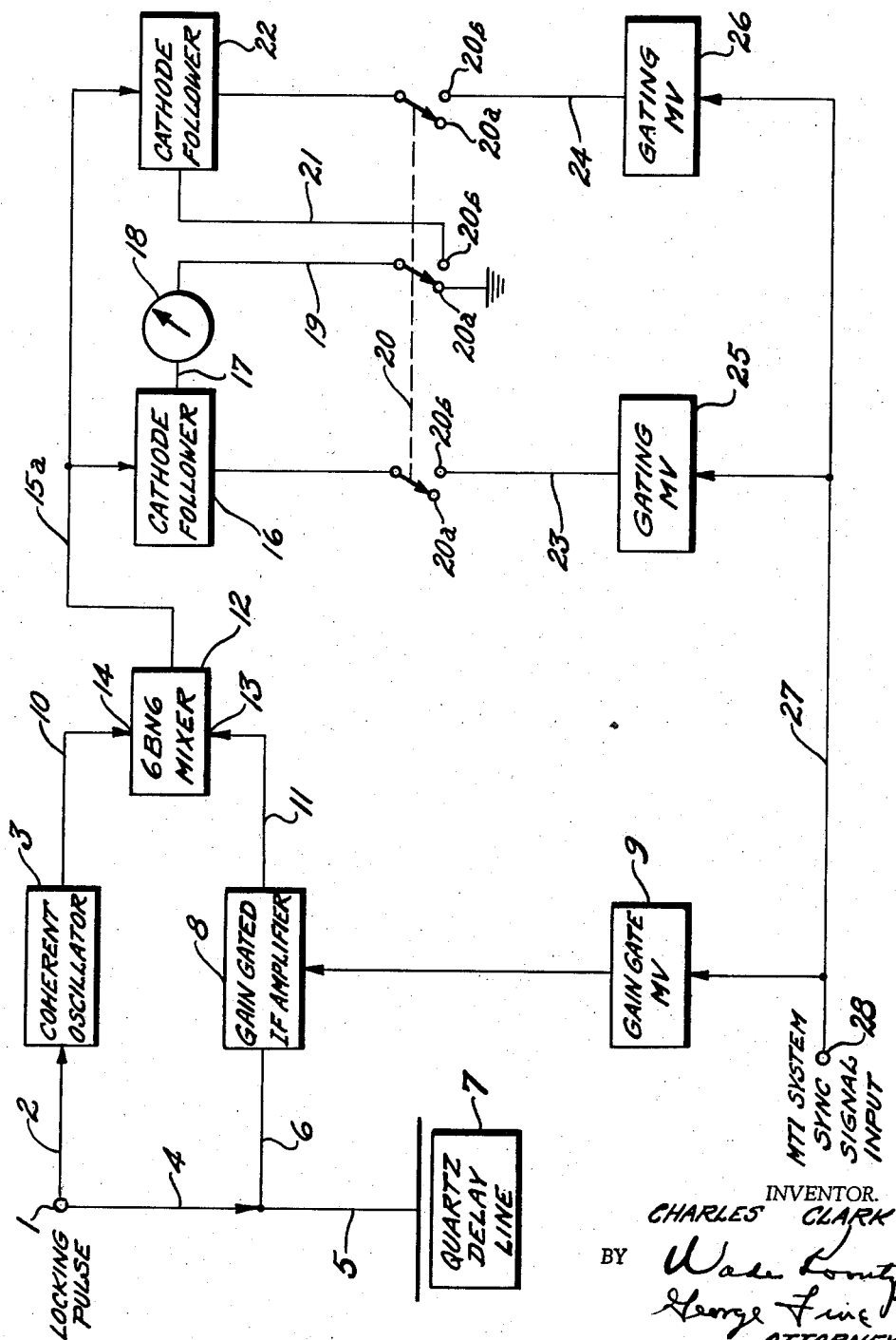
INVENTOR.
CHARLES CLARK JR.
BY
ATTORNEYS United States Patent Office 2,965,844
Patented Dec. 20, 1960

2,965,844

VISUAL INDICATING APPARATUS

Charles Clark, Jr., Baltimore, Md., assignor, by mesne assignments, to the United States of America as represented by the Secretary of the Air Force Filed Nov. 14, 1957, Ser. No. 696,576

2 Claims. (Cl. 324—82)

This invention relates to measuring and indicating apparatus and more particularly to means for selectively utilizing measuring and indicating apparatus for the purpose of comparing two different portions of a preselected period.

The invention finds important utility as a method of monitoring and evaluating the operations of searching and tracking systems, as, for example, systems of the MTI category. In such systems, the range of coverage is preselected. There exists limitations as to the precision of measurements in such systems because of jitter present therein.

This jitter is caused by the phase locked oscillator which is part of the MTI system. The jitter of the oscillator can result from two causes. One is improper phase locking of the oscillator under observation and the other is frequency drift of the oscillator due to hum modulation of the oscillator tube, excessive plate voltage ripple, a bad by-pass condenser in the oscillator tube circuit, or oscillator tuning elements changing values due to temperature change or aging.

It is highly desirable that an operator of an MTI system be able to measure and have visibly indicated the amount of jitter existing in the oscillator circuit in addition thereto the operator would be able to more efficiently utilize an MTI system when it is possible to have a visual indication of the relative amount and cause of jitter by either improper locking or excessive frequency drift of the MTI oscillator.

In my copending application, now Patent No. 2,933,-683, entitled, Phase Controlled Measuring System filed on even date herewith, I have shown a system for measuring jitter present in a phase locked oscillator. A 6BN6 beam gated tube is utilized as a phase detector; thus, any difference in phase of two signals fed into said tube will be detected. This difference in phase represents jitter present in a phase locked oscillator which is part of an MTI system. Where no difference in phase exists, current through the 6BN6 tube will be at some fixed amplitude. Where the jitter is caused by improper phase locking the current will decrease; if the jitter is as a result of frequency drift in the oscillator, the current will increase. In either case, there will be a variation of current from a fixed level wherever jitter is present. However, since there exists in an MTI system a preselected range, it is possible to compare two portions of the MTI range to one another to provide a means for indicating whether the jitter is caused by improper phase locking or whether it is caused by frequency drift of the phase locked MTI oscillator.

It is an object of the present invention to provide apparatus to measure and indicate the jitter present in an MTI system.

It is further an object of this invention to provide apparatus which will compare two different portions of a preselected MTI range to one another.

It is a still further object of this invention to provide apparatus to visually indicate the relative amount and cause of jitter in a phase locked oscillator.

A more complete understanding of the operation of the present invention, as well as other objects and advantages thereof, will be gleaned from a perusal of the following specification especially when taken in connection with the accompanying drawing which illustrates one method of utilizing the invention which has proven itself in actual application to MTI operations.

Referring to said drawing, there is indicated a signal measuring line 15a constituting the output of 6BN6 mixer 12 whose control inputs 13 and 14, respectively, receive the signals derived from locking pulses injected at input terminal 1 by way of line 2 to coherent oscillator 3 and by way of lines 4 and 5 to quartz delay line 7. The coherent oscillator 3 is phase locked by said locking pulse. Quartz delay line 7 generates a series of 30 megacycle pulses when locking pulses are fed into it and the pulses are then fed into gain gated IF amplifier 8 by way of lines 5 and 6. The amplitudes of the pulses are normally of different amplitudes so as to overcome the different amplitude levels that are generated from the locking pulse being applied to the reflecting quartz delay line 7, IF amplifier 8 is gated by synchronized multivibrator 9 so that all the pulses on line 11 at output of amplifier 8 have the same amplitude. The synchronizing pulses for multivibrator 9 are supplied from terminal 28 which in turn receives it from the MTI system. The synchronizing pulse is related in time to aforementioned locking pulse.

The amplified pulse output from amplifier 8 and the C.W. signal from coherent oscillator 3 are fed into 6BN6 mixer 12.

The output from 6BN6 mixer 12 described in my copending application entitled, Phase Controlled Measuring System filed on even date herewith, has a fixed current amplitude when both input signals to the input circuits of 6BN6 mixer are in phase. When jitter is present in oscillator 3 because of improper phase locking or frequency drift, the output from 6BN6 mixer 12 will vary from its fixed amplitude.

The selective utilization of my present invention is comprised of a switching mechanism 20 which is normally in position 20a. In this position, the output of 6BN6 mixer 12 is coupled to cathode followers 16 and 22. However, normally cathode follower 16 is in operation. In normal operation, the output of 6BN6 mixer 12 is fed through cathode follower 16 to D.C. microammeter 18 and then to ground. Meter 18 indicates, after initial calibration, the relative amount of jitter present in the system. Meter 18 may be calibrated in any convenient scale or system that indicates to the operator whether the jitter is acceptable, or the borderline, or not acceptable.

When the operator wants to determine what is causing the jitter, he may actuate switch 20 from normal position 20a to 20b. This will cause meter 18 to measure and indicate whether the jitter is caused by improper locking or excessive coherent oscillator frequency drift.

Actuating switch 20 from position 20a to 20b removes meter 18 from its position between cathode follower 16 and ground and places meter 18 between the outputs of cathode followers 16 and 22 by way of lines 17, 19 and 21. Simultaneously gating multivibrator 25 is connected to cathode follower 16 by way of line 23 and gating multivibrator 26 is connected to cathode follower 22 by way of line 24. Gating multivibrators 25 and 26 receive synchronizing pulses from terminal 28 by way of line 27.

Cathode followers 16 and 22 are gated on and off to allow a comparison of two different periods within the MTI range to determine the cause of jitter. Cathode follower 16 is gated on by multivibrator 25 for two hundred (200) microseconds and cathode follower 22 is cut off for four hundred (400) microseconds with the timing set such that cathode follower 16 is on for the first third part of the MTI range of six hundred (600) microseconds and cathode follower 22 is cut off only for the first two thirds of the MTI range period. This arrangement allows cathode follower 16 to measure the jitter of the first third of the MTI range and cathode follower 22 to measure the jitter of the last third of the MTI range. The outputs of each gated cathode follower represents the amount of jitter per time gated and these two outputs are applied to zero centered D.C. microammeter 18. If the meter reading is zero, the jitter is caused by improper locking; however, a reading to either side of zero indicates that the jitter is caused by frequency drift of oscillator 3. Because the locking pulse is an I.F. signal that is used to lock the oscillator in phase, jitter will exist if the oscillator is not properly locked. The phase error detected by the 6BN6 mixer will be a constant error since the lock pulse "hits" the oscillator 3 only once per repetition period to phase the oscillation (cause coherence).

Because of this constant phase error, each output of the cathode follower will be equal; thus the meter reading will be zero. When the jitter is caused by frequency drift, the phase error will be changing, at an unknown rate, and because the comparison periods are relatively far apart, the probability that the two cathode follower outputs will not be equal to very high; consequently, the reading probably will not be zero. The meter can be calibrated to indicate the relative degree of frequency drift.

What is claimed is:

1. In a system including a pair of signal generators adapted to receive actuating energy in the form of common electrical pulses having a preselected repetition rate, and a phase detector adapted to receive the respective outputs of said signal generators, the combination with such phase detector of a pair of cathode follower circuits connected to receive the output of said signal generators, said pair of cathode followers having an energy input which is the resultant of the combined output of said signal generators, means to supply gating pulses to each of said cathode follower circuits to obtain periodic samplings of a pattern established by said actuating pulse, and wherein said sampling means comprise pulse input lines controlling the operation of said cathode follower circuits, means for causing said pulse input lines to apply to said cathode follower circuits gated pulses synchronized with the electrical pulses which actuate said signal generators, and manual operable means for rendering said operation controlling means effective during selected stages of the signal generating cycle, wherein said manually operable means includes switch mechanism bridging both input and output circuits of said cathode follower circuits.

2. A system as defined in claim 1 and further including visual output indicating means connected to become effective in one predetermined position of said switching means.

References Cited in the file of this patent

UNITED STATES PATENTS

| | | |
|---|---|---|
| 2,438,801 | Braden | Mar. 30, 1948 |
| 2,494,339 | Keister | Jan. 10, 1950 |
| 2,530,035 | Watt | Nov. 14, 1950 |
| 2,706,265 | Beuhler | Apr. 12, 1955 |
| 2,750,563 | Winter | June 12, 1956 |
| 2,778,933 | Crist | Jan. 22, 1957 |
| 2,790,077 | Hinckley | Apr. 23, 1957 |
| 2,802,105 | Odden | Aug. 6, 1957 |
| 2,858,425 | Gordon | Oct. 28, 1958 |
| 2,877,414 | Pope | Mar. 10, 1959 |